2,767,047

PROCESS OF SEPARATING TANTALUM AND NIOBIUM VALUES FROM EACH OTHER

Harley A. Wilhelm, Ames, Iowa, and James V. Kerrigan, Chicago, Ill., assignors to the United States of America as represented by the United States Atomic Energy Commission No Drawing. Application October 20, 1953, Serial No. 387,338

17 Claims. (Cl. 23—23)

This process deals with the recovery of tantalum values from aqueous solutions, and in particular with the separation of tantalum fluoride from niobium fluoride by solvent extraction.

Niobium and tantalum occur together in a great many ores, for instance, in the columbite-tantalite-type ores. These are oxidic ores containing niobium and tantalum in the form of the pentoxides mainly in association with ferrous oxide and manganous oxide. The formula of columbite-tantalite ore is $[(Nb, Ta)O_3]_2 (Fe, Mn)$; it also contains small quantities of tin oxide, titanium oxide, aluminum oxide and silica. Fergusonite is another ore containing both niobium and tantalum; it has the formula $Y(Nb, Ta)O_4$. The residues obtained in processing blomstrandine also contain both niobium and tantalum values.

Tantalum has a great many uses in metallurgy and in particular as a component of alloys; it is mostly desirable to incorporate the tantalum in pure form and, for this reason, it was necessary to devise a process by which the tantalum could be effectively separated from the niobium associated therewith. Niobium, being in the same group of the periodic table as tantalum, has very similar chemical properties and for this reason separation of the two elements has been found rather difficult.

It is an object of this invention to provide a process by which niobium values and tantalum values can be separated in an effective and simple manner.

It is also an object of this invention to provide a process by which tantalum compounds can be recovered in a high degree of purity from substances containing a mixture of tantalum values and niobium values.

These and other objects are accomplished by preparing an aqueous acid solution of the fluoride of said values, contacting said aqueous solution with a substantially water-immiscible organic oxygen-containing solvent containing at least five carbon atoms and selected from the group consisting of esters, alcohols, ketones, and aldehydes, and separating an organic, preferentially tantalum-containing phase from an aqueous niobium-containing phase.

The ores and niobium- and tantalum-containing residues are suitably first processed to remove other ingredients and to obtain niobium and tantalum in the form of a compound which can easily be fluorinated. The oxides, for instance, react with hydrogen fluoride to form pentafluorides. Such processing methods for the ores do not form a part of this invention and are known to those skilled in the art. One preferred method of opening the columbite-tantalite-type ores is described in the assignee's copending application, Serial No. 387,083, filed on October 19, 1953, by Harley A. Wilhelm et al.

A great many organic solvents were tested in the experiments leading to the invention and it was found that the compound to be used as the selective solvent for the fluoride had to have at least five carbon atoms and had to contain an oxygen atom; esters, alcohols, ketones and aldehydes were found suitable. A number of compounds not complying with this requirement were found inoperative. Illustrative compounds satisfactorily operative are tributyl phosphate, diisopropyl ketone, iso-amyl alcohol, sec-amyl alcohol, cyclohexanone, mesityl oxide, isophorone, and methyl n-hexyl carbinol.

As has been mentioned above, the extraction has to be carried out from an acid solution and the niobium and tantalum values have to be present as fluorides. One way of obtaining such a feed solution having the proper concentrations is by dissolving, or converting to fluorides, the niobium and tantalum compounds in an excess of hydrofluoric acid and adjusting the excess so that the desired degree of acidity is obtained. Adjustment of acidity, however, can also be accomplished by the addition of hydrochloric acid to the fluoride-containing solution.

The presence of hydrogen chloride in the aqueous feed improves both total quantity extracted and the separation of tantalum from niobium. However, it has the disadvantage of often causing precipitation in the aqueous phase after about 15 minutes. Therefore, if the aqueous phase obtained is to be stored for a longer period of time prior to recovery of the values contained therein, it is advisable to adjust the acidity with hydrofluoric acid. However, the presence of other mineral acids, such as nitric acid, sulfuric acid and perchloric acid, has been found not to impair a satisfactory operation.

Two types of 50-microliter solutions were prepared, one of niobium fluoride and the other one of tantalum fluoride, each containing fluoride equivalent to about 1 mg. of the oxide. The tantalum solution contained a tracer concentration of $Ta^{182}$, whereas the niobium solution contained a tracer concentration of $Nb^{95}$. Various types of acids were added to the aqueous solutions for the extraction and the total volume of feed for each experiment was then adjusted to 1 ml. The extractant in all of these examples was diisopropyl ketone, which had been preequilibrated with the respective acids; 1 ml. thereof was added for each extraction. The extraction was carried out at room temperature. The mixture of aqueous feed and the ketone was stirred with a platinum wire for 1 minute and then centrifuged. Aliquots were then taken from each phase for analysis by counting radioactivity. The results of these experiments are compiled in Table I.

*Table I*

| Initial Acid Concns. of Aqueous Feed Solns. | Element | Percent Extracted | Extraction Coefficient | Ratio of Extraction Coefficients, Ta/Nb |
|---|---|---|---|---|
| HCl 3.70 M and HF 0.40 M | Ta | 81 | 4.3 | |
| HNO₃ 3.92 M | Nb | 4.5 | 0.047 | 91 |
| and HF 0.40 M | Ta | 79 | 3.8 | |
| H₂SO₄ 4.50 M | Nb | 0.43 | 0.0043 | 880 |
| and HF 0.40 M | Ta | 95 | 19 | |
| HClO₄ 4.61 M | Nb | 11 | 0.12 | 160 |
| and HF 0.40 M | Ta | 90 | 9.0 | |
| | Nb | 3.0 | 0.031 | 290 |

From these data it is obvious that a good separation was obtained in all instances and that tantalum fluoride was extracted to a considerably higher degree than niobium fluoride.

The effect of hydrofluoric acid concentration in feed solutions containing hydrochloric acid of different molarities ranging from 0.12 to 6.16 M has been studied. It was found that between a hydrofluoric acid content of 0.1 and 0.4 M extractability of tantalum was noticeably improved with increase of hydrofluoric acid concentration. A further concentration increase, for instance to 0.6 M, brought about a very minor, almost negligible degree of improvement. The hydrochloric acid concentrations giving the best results with all hydrofluoric acid concentrations tested were between 4 and 6.16 M.

The tantalum extraction was found to increase with increasing concentration of hydrochloric acid or other acid. However, it was found that at a total acidity of above about 6.5 M the niobium extraction also increased, so that the separation was impaired. The upper limit for total acidity should therefore be 6.5 M. In other words, optimal conditions in regard to minimum niobium extraction and maximum tantalum extraction are also obtained with a feed solution containing about 0.4 M hydrofluoric acid and the second mineral acid in a concentration of about 6 M.

In Table II a number of experiments are listed which were carried out with feed solutions containing both niobium and tantalum fluorides. These solutions were obtained by dissolving a mixture of the oxides in an excess of hydrofluoric acid and, with the exception of Experiments 2 and 3, no other mineral acid was used. In these experiments the total content of niobium and tantalum fluorides (expressed as the oxides) present in the volume of feed solution used ranged between 1.15 and 7.277 grams, with the exception of Experiment 3 where the total content was 25.4 milligrams; the weight ratio of tantalum oxide to niobium oxide was 55.6:44.4 in all experiments, with the exception of Experiment 3 in which it was 48:52.

Table II

| Expt. | Quantity used, ml. | Type | Solvent, Quantity used, ml. | Total quantity extracted, percent | Weight ratio, $Ta_2O_5:Nb_2O_5$ in— | |
|---|---|---|---|---|---|---|
| | | | | | Organic phase | Aqueous raffinate |
| 1 | 25 | Tributyl phosphate | 25 | 58.2 | 93.85:6.15 | 3.8:96.2 |
| 2 | [1] 25 | ...do... | 25 | 54.3 | 94.8:5.2 | 6.3:93.7 |
| 3 | [2] 5 | Diisopropyl ketone [3] | 5 | | 99.5:0.5 | 2:98 |
| 4 | 25 | Iso-amyl alcohol | 25 | 39.8 | 96:4 | 16.7:83.3 |
| 5 | 10 | ...do... | 50 | 56.7 | 79:21 | 6:94 |
| 6 | 25 | Sec-amyl alcohol | 25 | 41.7 | 83.5:16.5 | 10.5:89.5 |
| 7 | 25 | Cyclohexanone | 25 | 53.9 | 95:5 | 4.7:95.3 |
| 8 | 25 | Mesityl oxide | 25 | 50 | 97.7:2.3 | 6:94 |
| 9 | 25 | ...do... | 25 | 48.8 | 93.3:6.7 | <0.05:99.95 |
| 10 | 25 | Isophorone | 25 | 51.7 | 96.9:3.1 | 1.8:98.2 |

[1] 2 ml. 1 M NaCl were added to aqueous feed.
[2] Feed was 3 M in HCl; 0.4 M in HF.
[3] The aqueous phase obtained was extracted once more and the first organic phase was washed with 3 M HCl and 0.4 M HF; washings and second extract were discarded.

These experiments show clearly the high degree of separation obtained with the various solvents.

It was found that a separation of other values can also be accomplished using the solvents of this application and a feed solution 6 M in hydrochloric acid and 0.4 M in hydrofluoric acid. For instance, using diisopropyl ketone as an extractant, it was found that the values of halogens, Fe(III), Ga(III), Sb(V), As(III), Se(VI) and Te(VI) are preferentially extracted into the solvent, while under the very same conditions and using the same solvent, the values of Si(IV), Sn(IV), Ti(IV), Mn(II), Zr(IV) and Hf(IV) preferentially remain in the aqueous raffinate. This indicates that the process of this invention is also applicable to the separation of tantalum and/or niobium from any values of the groups just listed.

It will be understood that this invention is not to be limited to the details given herein but that it may be modified within the scope of the appended claims.

What is claimed is:

1. A process of separating tantalum values from niobium values from a mixture thereof, comprising preparing an aqueous mineral acid solution of the fluorides of said values, contacting said aqueous solution at room temperature with a substantially water-immiscible organic oxygen-containing solvent containing at least 5 carbon atoms and being selected from the group consisting of tributyl phosphate, iso-amyl alcohol, sec.-amyl alcohol, methyl n-hexyl carbinol, mesityl oxide, diisopropyl ketone, cyclohexanone, and isophorone, and separating an organic preferentially tantalum-containing phase from an aqueous niobium-containing phase.

2. The process of claim 1 in which the acidity of said solution is a maximum of 6.5 M.

3. The process of claim 1 in which said solution contains hydrofluoric acid in a concentration of about 0.4 M.

4. The process of claim 3 in which the aqueous solution contains one other mineral acid in addition to the hydrofluoric acid.

5. The process of claim 4 in which said other mineral acid is hydrochloric acid.

6. The process of claim 5 in which the hydrochloric acid concentration is about 6 M.

7. The process of claim 4 in which said other mineral acid is nitric acid.

8. The process of claim 4 in which said other mineral acid is sulfuric acid.

9. The process of claim 4 in which said other mineral acid is perchloric acid.

10. The process of claim 1 in which said solvent is an alkyl phosphate.

11. The process of claim 10 in which said alkyl phosphate is tributyl phosphate.

12. The process of claim 1 in which said solvent is a ketone.

13. The process of claim 12 in which said ketone is mesityl oxide.

14. The process of claim 12 in which the ketone is cyclohexanone.

15. The process of claim 1 in which said solvent is an alcohol.

16. The process of claim 15 in which said alcohol is iso-amyl alcohol.

17. The process of claim 15 in which said alcohol is sec-amyl alcohol.

References Cited in the file of this patent

Degering, Nelson, Harrod and others: book "An Outline of Organic Chemistry," 1937 ed., page 54. Barnes and Noble, Inc., New York.

Journal of the Chem. Soc., April 1952, pages 1497–1504.

J. W. Mellor: "A Comprehensive Treatise on Inorg.

(Other references on following page)

and Theo. Chem.," vol. 9, 1929 ed., pages 837, 838. Longmans, Green and Co., New York.

Analytical Chemistry, vol. 25, No. 10, October 1953, pages 1517–1519. See page 4A of volume copy wherein it is indicated that copies of Anal. Chem. are published on the 15th of each month. Also see page 1519 wherein it is indicated that the articles were received January 13, 1953, and accepted for publication July 22, 1953.

"The analysis of Uranium-Tantalum and Uranium Niobium Alloys," an A. E. R. E. Report C/R 895 by G. W. C. Milner and A. J. Wood.

"Tantalum and Niobium," by J. R. Werning and K. B. Higbit, U. S. Bureau of Mines, Albany, Oreg., Ind. and Eng. Chem., December 1954, pages 2491–2494.

J. W. Mellor: "A Comprehensive Treatise on Inorganic and Theoretical Chemistry," vol. IX, 1929 ed., pages 870–871, and 914–915. Longmans, Green and Company, New York.

"Handbook of Chemistry" by Lange, 1944 ed., pages 402–403; Handbook Publishers, Sandusky, Ohio.